(12) United States Patent
Pan

(10) Patent No.: US 8,887,213 B2
(45) Date of Patent: *Nov. 11, 2014

(54) HANDHELD MEDIA AND COMMUNICATION DEVICE WITH A DETACHABLE PROJECTOR FOR SHARING MEDIA ASSETS IN A GROUP

(76) Inventor: Yang Pan, Singapore (SG)

( * ) Notice: Subject to any disclaimer, the term of this patent is extended or adjusted under 35 U.S.C. 154(b) by 555 days.

This patent is subject to a terminal disclaimer.

(21) Appl. No.: 13/292,089

(22) Filed: Nov. 9, 2011

(65) Prior Publication Data

US 2012/0291075 A1 Nov. 15, 2012

Related U.S. Application Data

(62) Division of application No. 12/166,268, filed on Jul. 1, 2008, now abandoned.

(51) Int. Cl.
| | | |
|---|---|---|
| H04N 21/40 | (2011.01) | |
| G06F 3/14 | (2006.01) | |
| G06F 3/147 | (2006.01) | |
| H04N 9/31 | (2006.01) | |
| H04H 20/61 | (2008.01) | |
| H04L 29/08 | (2006.01) | |

(52) U.S. Cl.
CPC .............. *G06F 3/1454* (2013.01); *G06F 3/147* (2013.01); *H04N 9/3141* (2013.01); *H04N 9/3173* (2013.01); *G09G 2370/16* (2013.01); *H04H 20/61* (2013.01); *H04L 29/08729* (2013.01); *H04L 67/12* (2013.01)
USPC ........................................... 725/81; 455/41.3

(58) Field of Classification Search
None
See application file for complete search history.

(56) References Cited

U.S. PATENT DOCUMENTS

| | | | |
|---|---|---|---|
| 5,684,804 A * | 11/1997 | Baronetti et al. ............. | 370/509 |
| 6,115,618 A | 9/2000 | Lebby et al. | |
| 6,489,934 B1 | 12/2002 | Klausner | |
| 6,966,651 B2 | 11/2005 | Johnson | |
| 7,118,220 B2 | 10/2006 | Castaldi et al. | |
| 7,134,078 B2 | 11/2006 | Vaarala | |
| 7,599,177 B2 * | 10/2009 | Jaffe et al. ................. | 361/679.41 |
| 8,321,593 B2 * | 11/2012 | Bushell et al. ................ | 709/248 |
| 2002/0063855 A1 | 5/2002 | Williams | |
| 2003/0017846 A1 | 1/2003 | Estevez et al. | |
| 2003/0038927 A1 | 2/2003 | Alden | |
| 2003/0117343 A1 | 6/2003 | Kling | |
| 2006/0009257 A1 | 1/2006 | Ku | |
| 2006/0209374 A1 | 9/2006 | Willemsen | |
| 2006/0258289 A1 * | 11/2006 | Dua ............................. | 455/41.3 |
| 2007/0099700 A1 | 5/2007 | Solomon et al. | |
| 2007/0205980 A1 | 9/2007 | Dijk | |
| 2007/0229772 A1 | 10/2007 | De Vaan | |
| 2007/0273848 A1 | 11/2007 | Fan et al. | |
| 2007/0282564 A1 | 12/2007 | Sprague | |
| 2008/0014995 A1 | 1/2008 | Noba | |
| 2008/0055550 A1 | 3/2008 | Kim | |
| 2009/0046140 A1 * | 2/2009 | Lashmet et al. ................ | 348/51 |

* cited by examiner

*Primary Examiner* — Sath V Perungavoor
*Assistant Examiner* — Janese Duley

(57) ABSTRACT

A wireless network for delivering a media asset includes a plurality of media and communication devices. The media asset further includes a video file and an audio file. One of the devices is a controlling device. The video file is delivered by a projector unit and the audio file is delivered by the devices. The projector unit receives the video file from the controlling device when the unit and the device are connected. The controlling device can remotely control operations of the projector unit.

7 Claims, 9 Drawing Sheets

HANDHELD MEDIA AND COMMUNICATION DEVICE WITH A DETACHABLE PROJECTOR FOR SHARING MEDIA ASSETS IN A GROUP

CROSS-REFERENCE TO RELATED APPLICATIONS

The present application is a division of the application Ser. No. 12/166,268.

BACKGROUND

1. Field of Invention

This invention relates to a handheld media and communication device, specifically to a handheld media and communication device with a detachable projector, which may be used by a group of users to share a media experience effectively.

2. Description of Prior Art

A handheld device has been used as a media player and as a wireless communication device. An example of device is the iPhone from Apple, Inc Cupertino, which is used as a mobile phone, an apparatus for the Internet connection and an audio and video player. While the compactness of a handheld media and communication device is advantageous for portability with regard to ordinary voice communication and music playing, this diminution in size, by its very nature, creates a built in disadvantage with respect to the display of visual data such as a video clip because of a small display integrated with the handheld device.

One solution to the above-mentioned problem is to have a projector built into the handheld devices. U.S. Pat. No. 6,966,651 to Johnson (2005) disclosed an art of a portable multimedia projection system that integrates a portable housing, a media player, a sound system, an image projection device, a controller and a vibration dampening device. U.S. Pat. No. 6,489,934 to Klausner (2002) disclosed cellular phone with a built in optical projector for display of visual data. U.S. Pat. No. 7,134,078 to Vaarala (2006) disclosed an art related to a handheld portable user device and a method for the presentation of image. US patent publication 2003/0117343 by Kling proposed a mobile computer with an integrated micro projection display. US patent publication 2006/0209374 by Willemsen and US patent publication 2008/0014995 by Noba disclosed arts for integrating mobile phones with a built in projector to improve visual data presentation. US patent publications 2006/0009257 by Ku and 2007/0273848 by Fan et al disclosed arts for integrating a digital camera with a built in projector.

Recent advancement in MEMS (Micro Electro Mechanical System) technology has open up opportunities for commercialization of micro projectors built into the handheld devices. MEMS-based displays already exist in commercial products, such as the products from Texas Instruments, based in Dallas, Tex. The micro projector is based on a chip that uses millions of tiny minors, each of which turns pixels on and off by either turning toward or away from a light source. This chip is now used in a variety of televisions and movie projectors. Microvision, based in Redmond, Wash., has developed products with the micro projector integrated with a mobile phone. The projector developed at Microvision is composed of two main parts: a set of red, blue and green lasers made of semiconductor material, such as gallium indium arsenide, and a micro-minor that tilts on two axes. The lasers shine on the minor, and the mirror reflects the pixel of light onto a wall or other surface. The intensities of the lasers change to produce different colors. When all three are pumping out light full blast, the pixel is white; when all three are off, the pixel is black. Other colors are produced from various combinations in between.

There are two problems associated with such a built-in projector solution. One is that it is difficult for a user to hold a projector in hand stably for a prolonged period of time, when one is, for example, watching a movie, while operating the device. Various prior arts have been proposed to resolve the instability issue related to a handheld projector, including US patent publication 2002/0063855 by William, the publication 2003/0038928 by Alden, the publication 2007/02005980 by Dijk and the publication 2007/0282564 by Sprague et al. Although the negative effects originated from human hand instability for holding an object for a prolonged period of time may be reduced by increasing system complexity and cost, the issue cannot be eliminated completely because of its fundamental nature. It is desirable to have a detached projector when viewing a long video file. U.S. Pat. No. 6,115,618 to Lebby et al (2000) disclosed an art for a portable electronic device with removable display. The projector, however, is not able to be operated in a stand alone manner without an integrated power supply to the display unit. US patent publication 2002/0063855 by Williams proposed an implementation that the projector is integrated with a base station or a charging station. Another embodiment disclosed by Williams is for integrating the projector with an insertable card.

Another issue is related to the high power consumption of a handheld device with a built in projector. A handheld device is typically powered by a chargeable battery. Although the lifetime of the battery has been improved significantly over recent years, it remains as one of the key technical challenges for a mobile device. A built in micro projector with several lasers certainly makes the battery lifetime issue worse. US patent publication 2007/0229772 by De Vaan disclosed an art to manage power consumption by implementing of two drive power modes associated with different qualities of the projected image. The power modes are determined by the identification of the power source from either internal or external.

Another solution for the above-mentioned small display issue is to connect the device wirelessly to a projector. U.S. Pat. No. 7,118,220 to Castaldi et al (2006) described a method for interfacing a device to a projector connecting to the wireless network. Multiple apparatus may be connected to the same projector via the wireless network interface. The issue for such an implementation is lacking of portability for a completely separated projector.

Accordingly, it is a purpose of the present invention to provide a handheld media and communication device with a detachable projector with a portable capability of an enlarged display screen.

It is a further purpose of the present invention to provide a handheld device with a detachable projector with a power supply and the data storage and process unit. The projector, when detached, can be placed separately on a stable substrate while communicating wirelessly with the handheld device. The instability issue related to a user's hand holding operation can be eliminated completely.

It is a further purpose of the present invention to provide a handheld device with a detachable projector with a power supply and a data storage and process unit that can be used as backup resources for the handheld device when they are attached.

It is a further purpose the present invention to provide a method for a group of user to share video/audio media files in a synchronized manner by the use of handheld devices with detachable projectors.

It is a further purpose of the present invention to provide an expandable micro projector device by connecting sequentially a plurality of micro projectors, from which the power supplies and file systems are shared by the projector under the projection operation.

SUMMARY OF THE INVENTION

A handheld media and communication device comprises two detached units. One unit is a conventional handheld device (the handheld unit) with a wireless network interface and another unit is a projector made of lasers and MEMS micro-minors in one of the preferred embodiments (the projector unit). In the present invention, the projector unit further comprises a file system, a data process unit with a processor and a wireless network interface. The file system comprises a flash memory or a plurality of the flash memories.

The handheld unit can take various forms of a portable media and communication device such as a mobile phone, a portable digital camera, a personal computer including a laptop computer and a tablet computer, and a handheld media player such as an iPod from Apple. To simplify our discussion, we will use a handheld media player as an example to illustrate the present invention. The handheld unit comprises typically a user interface such as a LCD (Liquid Crystal Display) screen and a user interface such as a rotational interface used in the iPod. A portable power supply such as a battery for the portable media player is also included in the unit. The unit also includes a file system and a cache to store the catalog of available media items in the file system. In the present invention, the unit further comprises a wireless network interface device communicating with the projector unit when it is detached from the handheld unit.

The handheld unit and the projector unit are connectable through a wired connection. The handheld device with an attached projector provides the portability for a user. In one aspect of the present invention, a user may decide to use the projector unit in a detached manner to have a media experience with media files stored in the file system of the handheld unit. In such a circumstance, the user may utilize the user interface of the handheld unit to select a plurality of media files and to copy the files into the file system of the projector unit before the units are detached. The speed of the file transfer using a bus system in a handheld device is much higher than that of most wireless means. The metadata associated with the transferred files, however, is stored in the cache of the handheld unit for the future operation when the handheld unit is served as a remote control for the projector unit.

After the projector unit is detached from the handheld unit, a wireless communication link is established between two units. The projector unit comprising the power supply, the data file system, the cache and the processor operates in a stand alone manner with a remote control using the handheld unit. The user then places the projector unit on a stable substrate to project a visual image on an enlarged surface. The user interacts with the user interface of the handheld unit to remotely control the operation of the projector unit. For example, the user selects at least one of the metadata associated with the pre-selected media file that has already been transferred to the file system of the projector unit. After the selection, the metadata is sent to the projector unit through the wireless communication link. The processor in the projector unit controls an operation that the associated media file is retrieved from the file system and is delivered to the projector through the projector driver after the appropriate data processing.

Another aspect of the present invention is that the portable power supply such as the battery, the file system and the cache in the projector unit may be used as backup resources for the handheld unit when the projector unit is attached to the handheld unit. For example, a handheld media player may use the battery from the projector unit when its battery is running out. The operation is controlled by the processor in the handheld unit.

Yet another aspect of the invention is related to a group of users sharing a video/audio media experience with handheld devices. At least one of the devices is with a detachable projector. All the handheld devices involved in the operation have a wireless network interface sharing at least one of the wireless communication standards including the IEEE 802.11 (Wi-Fi). A local wireless network is established by a plurality of the devices. One of the users with the detachable projector is identified as the controlling user, who coordinates the operation of the media sharing experience. The controlling user copies media files to be shared into the file system of the projector unit before detaching the projector unit from the handheld unit. The user interacts with the user interface of the handheld unit to select the metadata of the media file to be played. The selected metadata is sent to the projector unit through the wireless network. The processor in the projector unit coordinates an operation that the video portion of the associated media file is sent to the projector for the projection while the audio portion of the file is broadcasted through the local wireless network. The handheld devices associated with the local wireless network receive the audio file and store the received data in the cache of the device. The users are able to view the visual image on an enlarged surface by the projector while to listen to high quality sound through a speaker system such as earphones connected to the handheld devices. The operation of playing video and audio signals is synchronized in a manner based on calibrated clocks of each individual device, which will be described in detail in following sections of the present disclosure.

Yet another aspect the present invention is that projector unit has an open slot that may be used optionally to connect with another similar projector unit from yet another handheld device. This innovative feature is in particularly useful to resolve power shortage issue when a group of users are sharing a long video/audio file such as a movie by the use of the projector unit when detached. In such an event, a plurality of projector units is connected and the power supplies from the other projector units are useful as backup ones for the unit under the projection operation. Furthermore, the media files stored in the file systems from the similar other projector units may also be retrieved by the processor in the projection unit under the operation and be shared by the group. The metadata of the media files stored in other projector units may be broadcasted by the processor in the operating projection unit through the local wireless network and be received by all users associated with the network. The received metadata may be used by anyone of the devices connected to the network when used as a remote control.

BRIEF DESCRIPTION OF THE DRAWINGS

For a more complete understanding of the present invention and its various embodiments, and the advantages thereof, reference is now made to the following description taken in conjunction with the accompanying drawings.

DETAILED DESCRIPTION

References will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of invention as defined by the appended claims.

Figure 1:
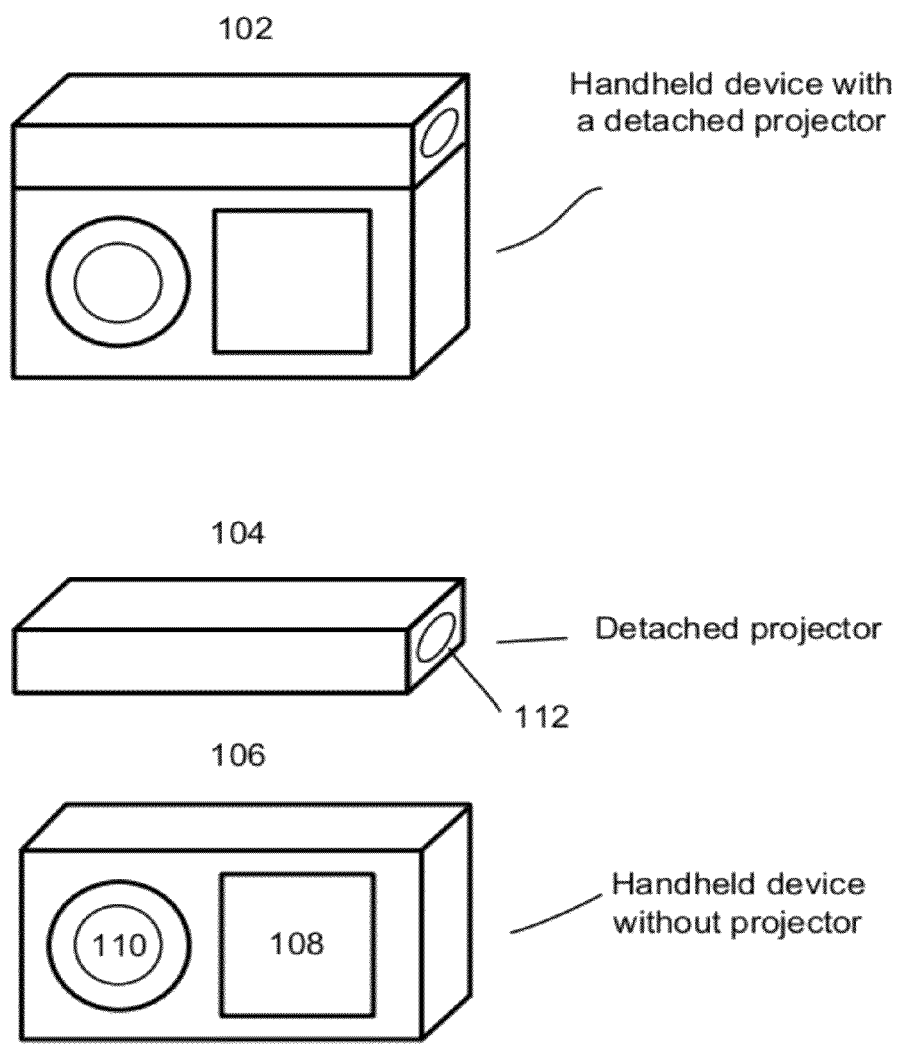
FIG. 1 is a schematic diagram of a handheld device with a detachable projector.

FIG. 1 shows a handheld device 102 comprising a detachable projector unit 104 and a handheld unit 106. The handheld unit 106 further comprises a display screen 108 and a user input device 110 such as a rotational user input device as used in the iPod from Apple. The projector unit 104 includes a micro projector 112. The connection for the projector 104 and the handheld unit 106 includes an IEEE 1394 compliant type connector. The two units are connected and a latch system may be utilized to ease the connecting and disconnecting operations as those are obvious to the ones familiar with the art. The two units may be detached when the player is intended for a user media experience with an enlarged display screen on a surface. In such a circumstance, the handheld unit with the user interface is used as a remote control. The detached projector unit is used as a stand alone projector controlled remotely by the handheld unit through a wireless communication link. The data is transmitted between the handheld unit and the projector unit via the wireless link that conforms to one of IEEE standards including IEEE 802.11 (Wi-Fi), IEEE 802.15.1 (Bluetooth) and IEEE 802.15.4 (ZigBee) and their extensions.

Figure 2:
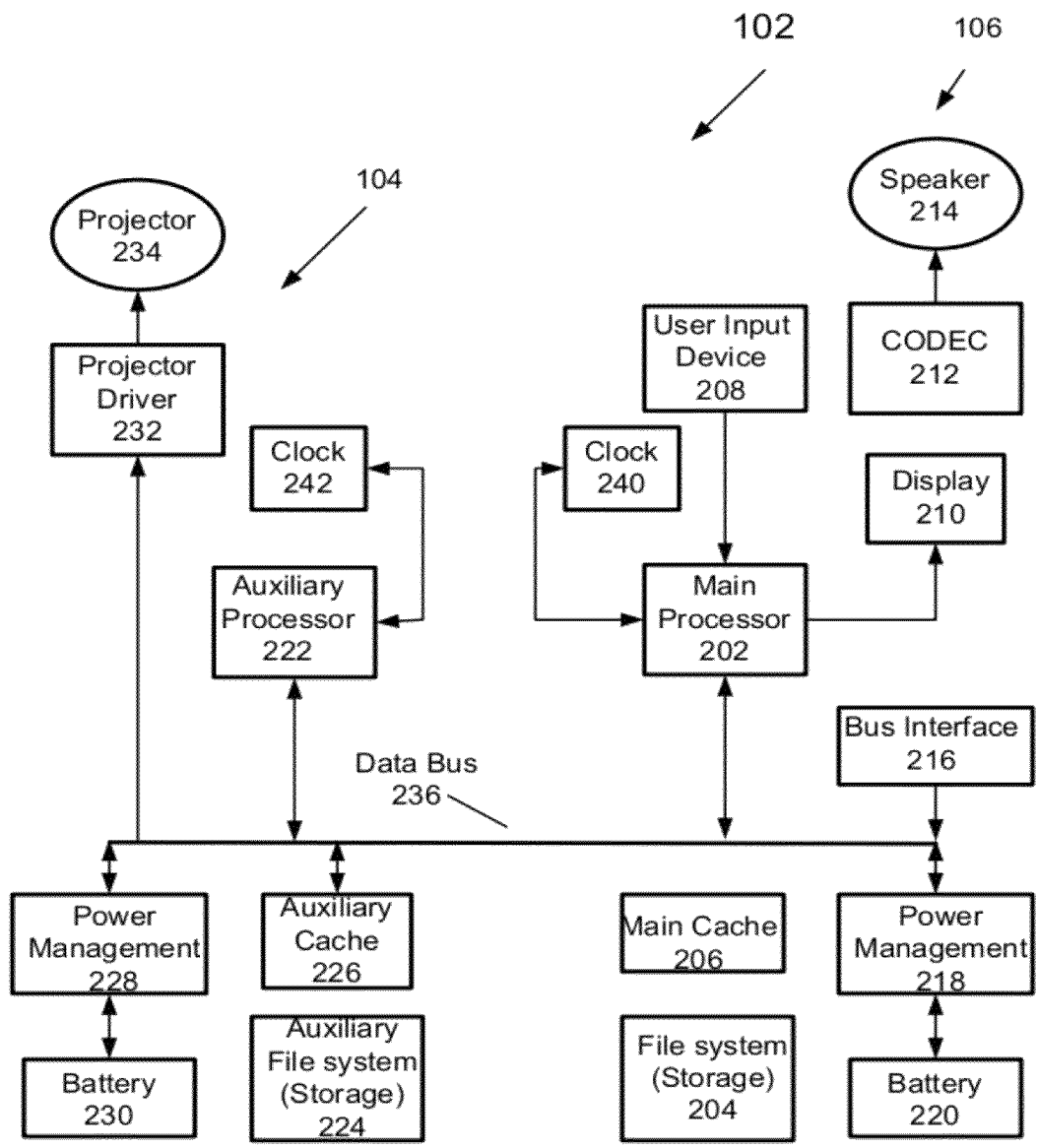
FIG. 2 is a schematic diagram illustrating functional blocks of a media player with a detachable projector unit.

FIG. 2 shows a schematic diagram illustrating functional blocks of the handheld device 102 with a detached projector 104. A media player 106 is taken as an exemplary handheld unit. The media player 106 includes a main processor 202 that pertains to a microprocessor or a controller for controlling the overall operation of the hand held device 102. The media player 106 stores media data pertaining to media assets in a main file system 204 and a main cache 206. The main file system 204 is, typically, a flash memory or a plurality of flash memories or a storage disk or a plurality of disks. The main file system 204 typically provides high capacity storage capability for the media player 106. However, since the access speed to the main file system 204 is relatively slow, the media player 106 can also include a main cache 206. The main cache 206 is, for example, RAM (Random-Access Memory) provided by semiconductor memory. The relative access time to the main cache 206 is substantially shorter than for the main file system 204. However, the main cache 206 does not have the large storage capacity of the main file system 204. Further, the main file system 204, when active, consumes more power than does the main cache 206. The power consumption is particularly important when the media player 106 is a portable media player that is powered by a battery 220 through power management circuits 218. The media player 106 may also include a RAM and a Read-Only Memory (ROM), which is not shown in the diagram. The ROM can store programs, utilities or processes to be executed in a non-volatile manner. The RAM provides volatile data storage, such as for the main cache 206.

The media player 106 also includes a user input device 208 that allows a user to interact with the media player. For example, the user input device 208 can take a variety of forms, such as a button, keypad, dial, etc. Still further, the media player 106 includes a display 210 (screen display) that is controlled by the main processor 202 to display information to the user. The projector unit comprises an auxiliary processor 222, which controls the operation of the projector unit 104, an auxiliary file system 224 and an auxiliary cache 226. It further comprises a projector driver 232 and a micro projector 234. The projector unit includes also a power management unit 228 and a battery 230. The CODEC 212 converts an audio signal to an analog signal to driver an external speaker 214 such as earphones. The media player 106 also includes a bus interface 216 that couples to a data link (not shown). The data link allows the media player 106 to couple to a host computer. A data bus 236 can facilitate data transfer among functional blocks. A clock 240 for the handheld unit 106 and a clock 242 for the projector unit are also depicted in the figure to measure local time for the units.

A user with a media player selects through its user interface either to use the display 210, which may be a conventional LCD screen or to use the micro projector 234 to project an enlarged visual display on a surface with an appropriate distance from the handheld device 102. Further, the user may choose to use the display 210 as an interactive user interface such as touch screen interfaces for interactively controlling of the device operation and to use the micro projector 234 for displaying an enlarged visual image.

Figure 3:
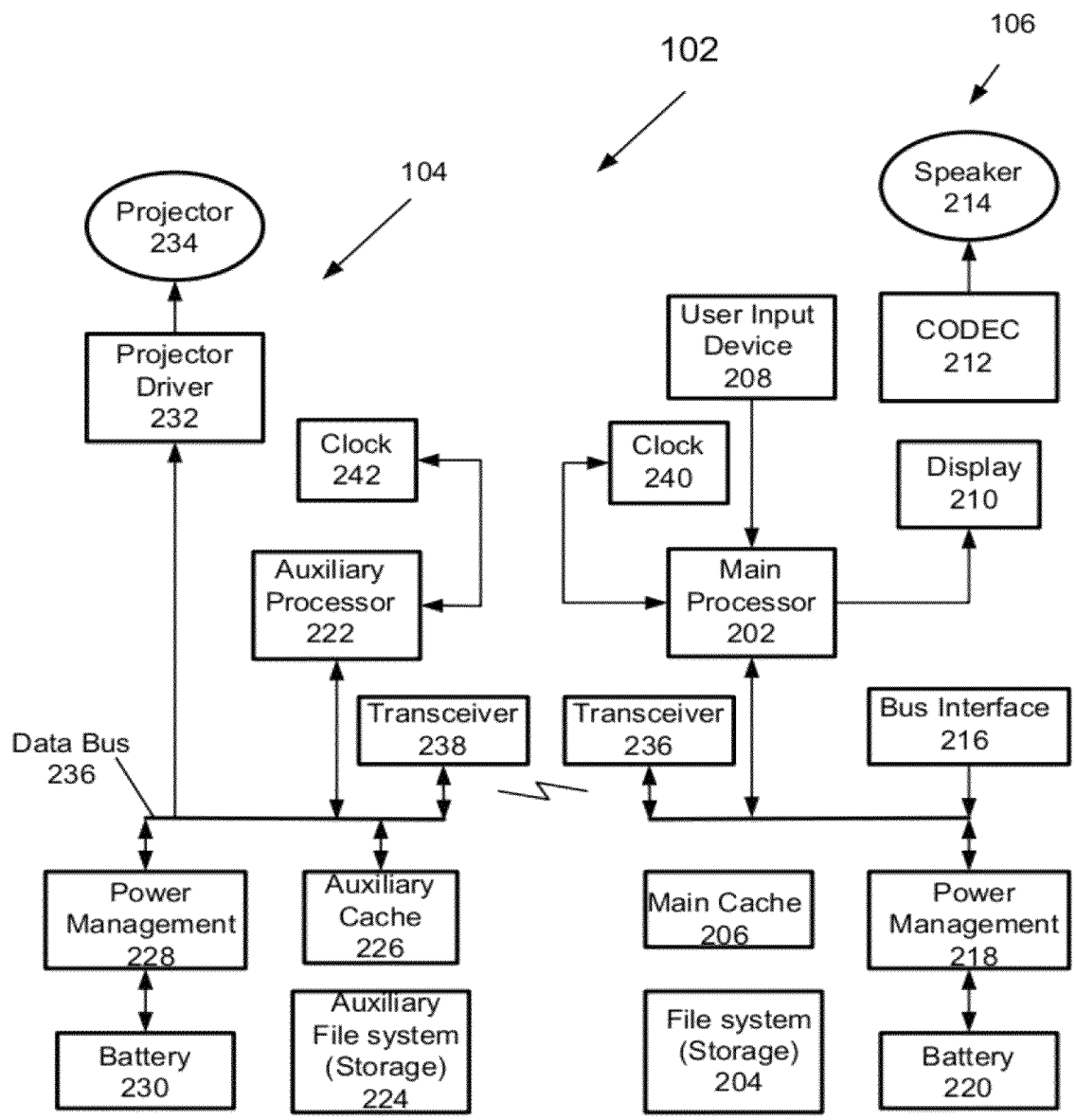
FIG. 3 is a schematic diagram illustrating functional blocks of a media player with a detached projector unit. The wireless network interfaces and clocks associated with each unit are depicted.

FIG. 3 depicts functional blocks of the handheld unit 106 with the projector unit 104 detached. The handheld unit 106 further includes a transceiver 236 and the projector unit 104 includes a transceiver 238. Both of the transceivers are not shown in the previous figure. The data is transmitted between the handheld unit 106 and the projector unit 104 via the wireless link that conforms to one of the IEEE standards including IEEE 802.11 (Wi-Fi), IEEE 802.15.1 (Bluetooth) and IEEE 802.15.4 (ZigBee) as well as their extensions. An antenna required for wireless networking is typically included within the housing of the wireless interface 236 and 238. Such an antenna may take a variety of forms, such as an antenna printed on a standard PCB (printed circuit board). Such antennas are well known to those skilled in the art.

The handheld unit 106 serves to store a plurality of media assets (e.g., video clips) in the main file system 204. Before the projector unit 104 is detached from the handheld media player 106, a user selects at least one of media files stored in the main file system 204 through the user input device 208. The main processor 202, upon receiving a selection of a particular media item, supplies the media data (e.g., video clip files) and transfers the selected media files into the auxiliary file system 224 in the projector unit 104.

Figure 4:
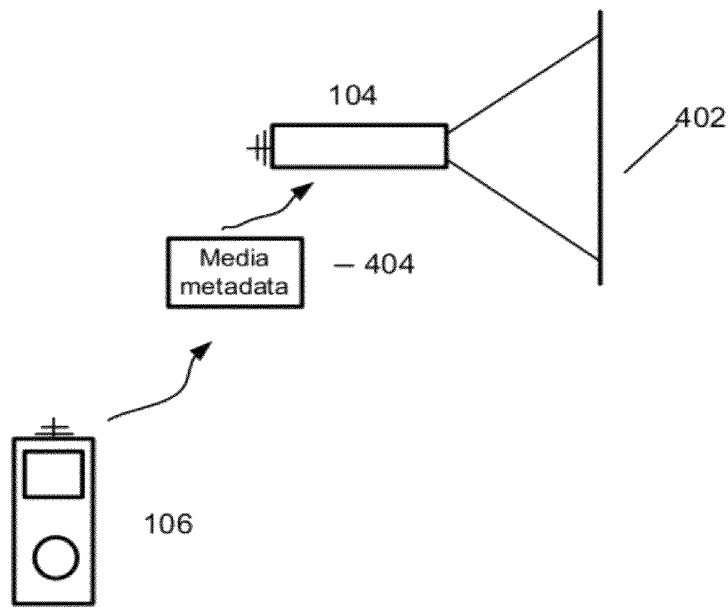
FIG. 4 shows a representative wireless connection between a handheld unit and a projector unit.

As shown in FIG. 4, in one embodiment, the present invention provides a method to use the handheld unit 106 to remotely control the projector unit 104. The method is carried out by wirelessly receiving a selected metadata of a media file from the handheld unit 106 by the projector unit 104. The projector unit 104 then executes the selection and further converts the associated media file into electrical signals suitable for further delivering to projector driver unit 232 by the auxiliary processor 222. Further, the processed signals drive the micro projector 234 via the projector driver 232 to display a visual image of the video clip on an enlarged surface 402.

The wireless network supported by the wireless network interfaces enables wireless communications between the handheld media player 106 and the projector unit 104. As briefly described above, the wireless network interfaces by the transceiver 236 and 238 have the ability to receive a user's instructions. Once a user has interacted with the handheld unit 106 to, for example, select a new video clip to be played, the media player (handheld unit 106) generates a media metadata 404 that is then forwarded to the projector unit 104. In response to the metadata 404, the projector unit 104 locates the video file associated with the metadata and delivers to the micro projector for a visual experience for the user on an enlarged display surface.

A method for sharing media assets such as a video clip by a group of users using a plurality of handheld media devices is described as follows. At lease one of the users has the device with a detachable micro projector. The other users have either conventional media players or similar media players with detachable projectors. All media players involved have a wireless network interface that conforms to the IEEE 802.11 standard (Wi-Fi) in our preferred embodiment.

Figure 5:
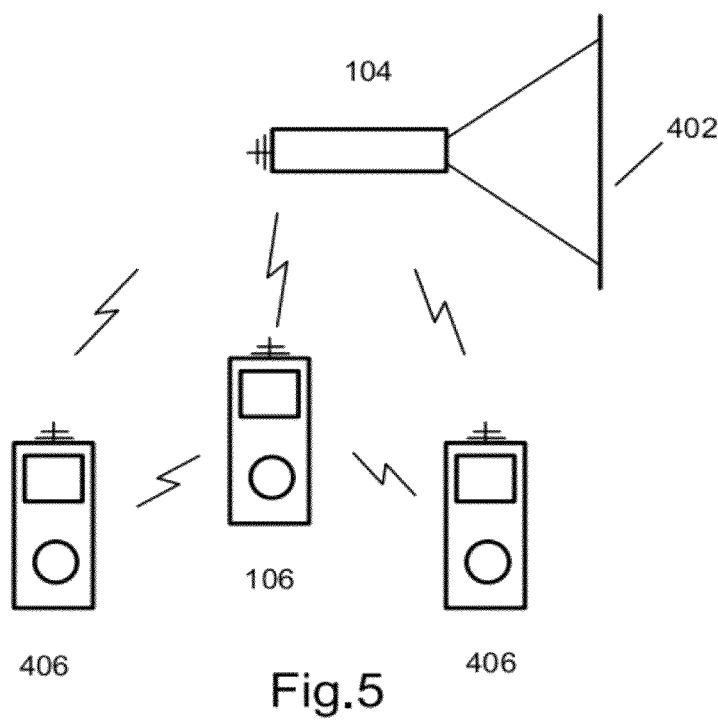
FIG. 5 shows a representative local wireless network with a plurality of handheld devices and a detached projector.

As shown in FIG. 5, one of the handheld media players with the detachable projector is selected as a control device 106. The user holding the control device detaches the media player and places the projector unit on a stable substrate to be ready for the projection of a visual image. A wireless communication channel is established between the handheld unit 106 and the projector unit 104. The selected media files have been stored in the auxiliary file system 224.

When other users with the handheld media players 406 that have the wireless network interfaces join the group, a wireless connection between the control device 106 and each of the handheld media players 406 is established. A local wireless network is formed among the handheld unit 106, the projector unit 104 and a plurality of other media players 406.

The control device 106 sends (broadcasts) the metadata of the pre-selected video clips to the handheld media players 406 through the established local wireless network. The other users confirm receiving the metadata and send back an acknowledgement signal to the control device 106 that is used as remote control for the projector unit 104.

At this stage, all handheld media players in the network have the metadata of the media files, that are taken exemplarily as video clip files, stored in the auxiliary file system 224 of the projector unit 104. In one implementation, anyone of the users is able to select a video clip metadata from the user interface. The metadata typically contains the title and the authors of the pre-selected video clips stored in the projector unit 104. After the selection, the request media metadata is sent to the projector unit 104. The projector unit 104 executes the selection and sends the associated video clip file for the processing controlled by the auxiliary processor 222 and eventually delivers the processed signals to the micro projector 234 for displaying an enlarged visual image.

In another implementation, anyone of users other than the control user needs to send a requesting signal to the handheld unit 106 of the control user. The selected media metadata can only be sent to the projector unit 104 if an approval signal is received by the media player 406 of the requesting user from the control device 106. The control user may accept or deny such a request. If the control user decides to accept the request, before he or she sends an approval signal to the requesting user, the control user needs to send a signal to the projector unit 104 to authorize the unit to accept the metadata selecting signal from the requesting user. The operation may be programmed and be controlled by the main processor 204 in the handheld unit of the control user.

Figure 6:
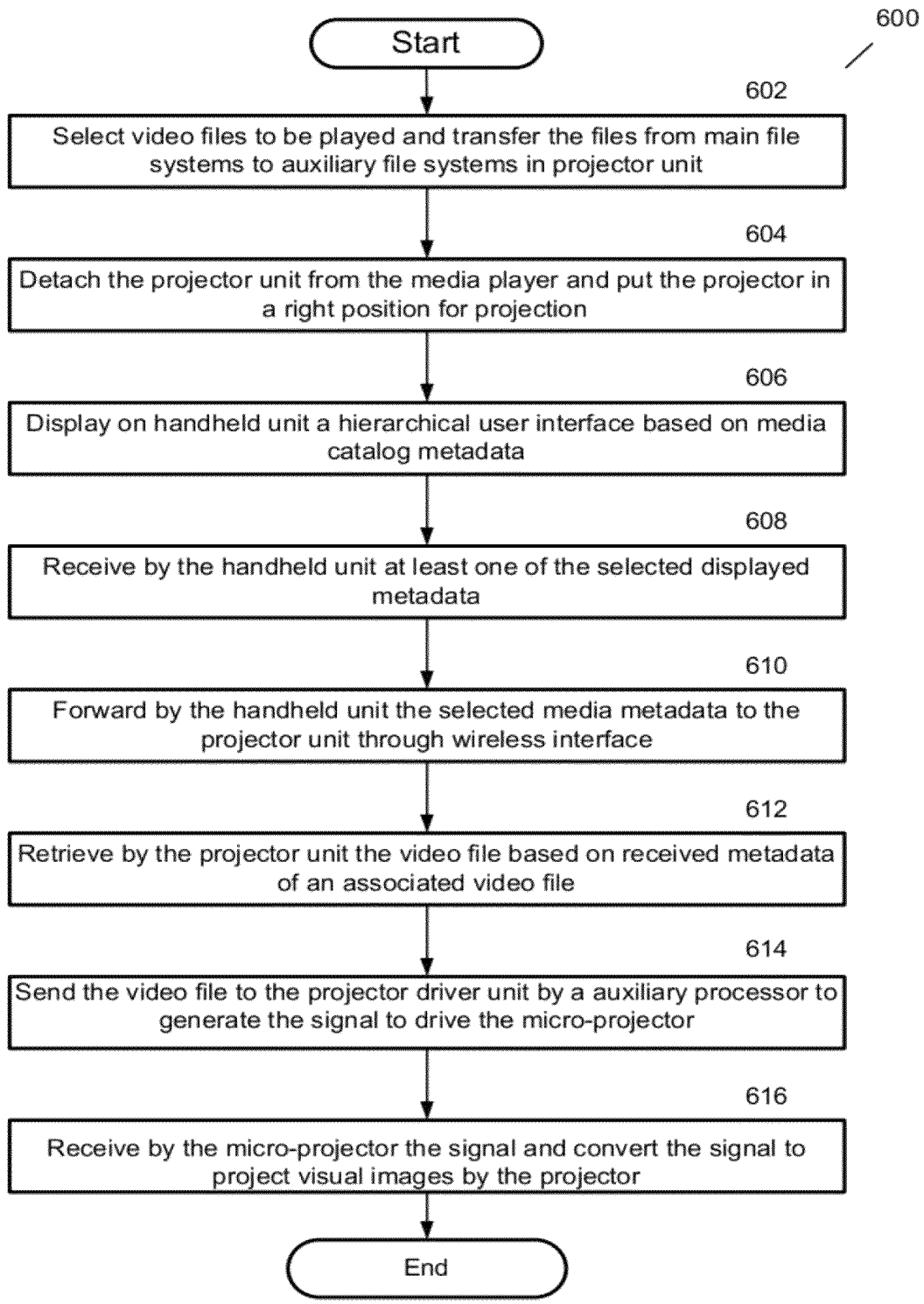
FIG. 6 shows a flow diagram of remotely accessing the detached projector unit through the handheld unit with a wireless communication link.

FIG. 6 shows a flow diagram of remotely accessing the detached projector unit through the handheld unit with a wireless communication link. The process 600 begins by a process 602 selecting media files to be played and transferring the files from the main file system to the auxiliary file system in the projector unit. A user then detaches the projector unit from the handheld unit and puts the projector unit on the top of a stable substrate and makes the projector ready for projection (604) followed by a user operating a hierarchical user interface of the handheld unit based on media catalog metadata (606). In any event, for a given media item (e.g., video clip), the metadata can include, video title, author, track duration, etc. that corresponds to the requested video clip and is typically much smaller in size than the associated video file. The user selects at least one of the displayed metadata and the handheld unit receives the selection (608). It should be noted that the video file request includes only descriptive information (e.g., metadata) necessary to uniquely identify the selected video clips stored in the auxiliary file system of the projector unit. At no time is the video data it transferred from the handheld unit to the projector unit, thereby avoiding any copyright infringement based upon protected contents. In addition, since the video file request represents a small data transfer (on the order of a few kilobytes), the amount of power required for the generation and forwarding of the video file request from the handheld media player to the projector unit is substantially reduced over that would be required to send the full video file. In this way, a user can effectively provide remote control of the projector unit by way without adversely affecting battery life of the handheld media player.

The handheld unit forwards the selected metadata to the projector unit via wireless communication means (610). In some cases, the video file request being wirelessly forwarded is accompanied by an associated control command to control the projector unit such as to change the contrast, brightness, etc. In response to the video metadata request from the handheld unit, the projector unit locates the requested video file associated with the metadata. The projector unit then retrieves the video file based on the descriptive information provided by the received metadata (612). The auxiliary processor in the projector unit sends the video file to projector driver to generate appropriate electrical signals to drive the micro projector that is MEMS based projector in our preferred embodiment (614), the projector receives the signals and converts the electrical signal into high quality visual signal via the projector (616).

Figure 7:
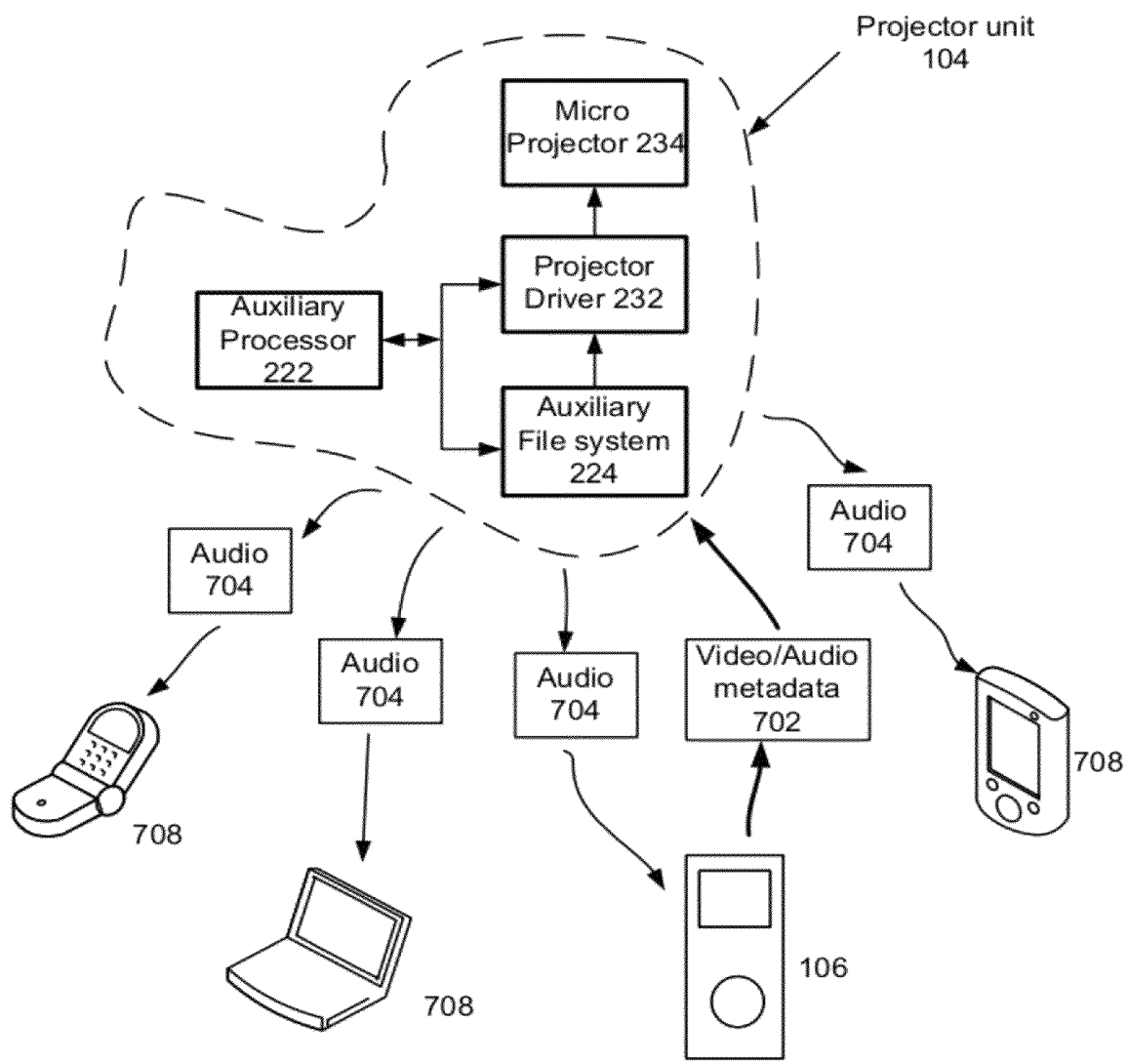
FIG. 7 shows a representative of a local wireless network broadcasting a synchronized video and audio media file by the use of a detached projector.

FIG. 7 illustrates a novel method that a group of users share a video/audio media file in a manner that video and audio signals are synchronized accurately. At least one of the users has a handheld media device with a detachable projector as described previously. The handheld device comprises a hand held unit 106 and a projector unit 104 that are connected via a wireless network interface, which conforms to the IEEE 802.11 standard (Wi-Fi) in our preferred embodiment. The other media devices 708 operated by other users in the group are with the wireless interface conforming to the same wireless communication standard. All the devices in the group form a local wireless network including the projector unit 104 with the pre-selected video/audio files to be shared.

When a video/audio clip is selected to be played by the handheld unit 106 of the control user, the metadata of the media file is sent to the projector unit 104, which retrieves the associated video/audio file from its auxiliary file system. The auxiliary processor in the projector unit determines a starting time for playing based on the instructions from the control user. The video portion of the file is sent to the projector driver for the signal processing and the audio portion is broadcasted to the local wireless network. All media devices in the network receive the audio file from the projector unit with an attached starting time for playing. Thus video and audio files are played based on the pre-determined starting time in a synchronized manner A group of users are able to enjoy the visual images by viewing the enlarged image projected by the projector and to enjoy the audio signals by use of earphones plugged into the individual media device without interference with each other.

Figure 8:
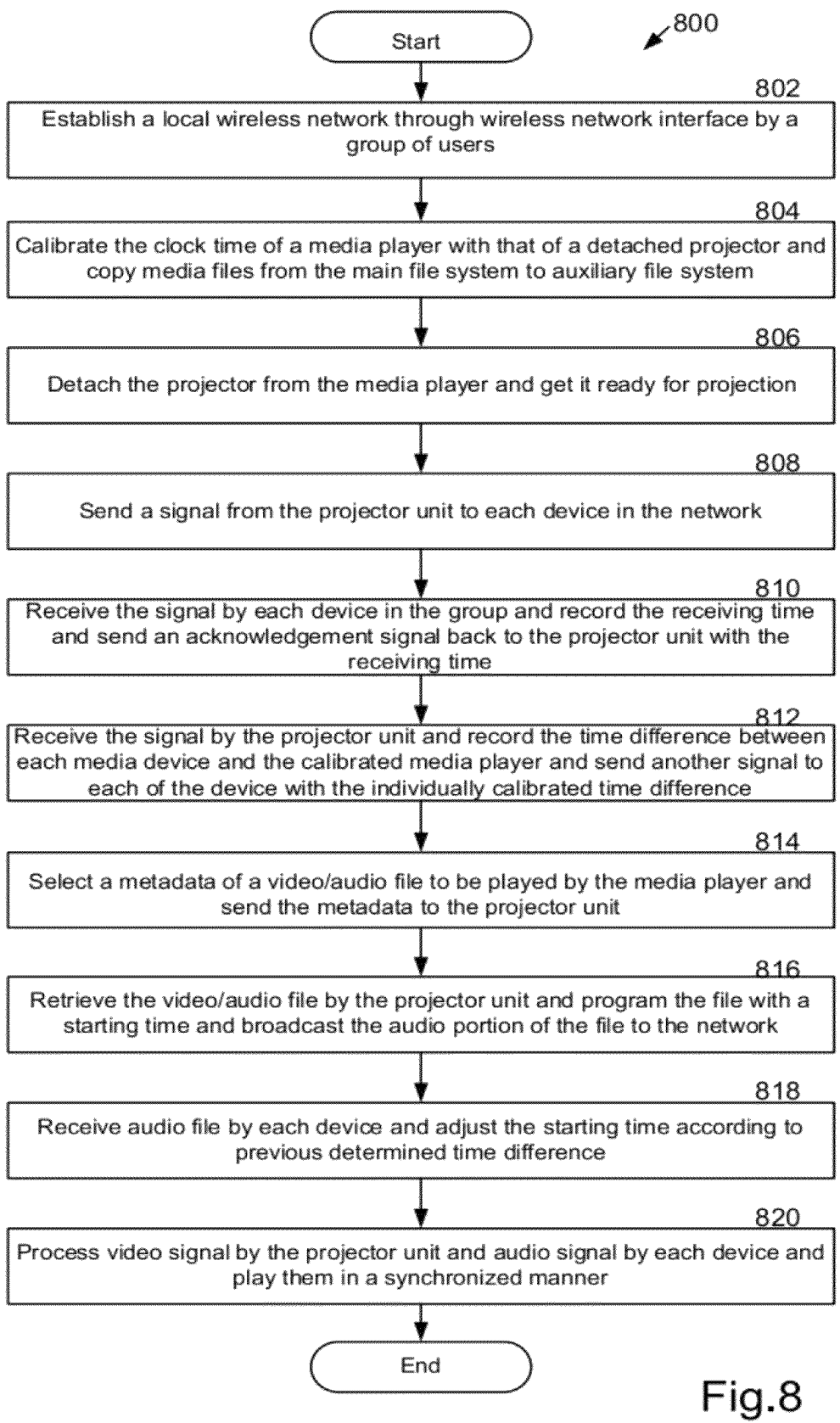
FIG. 8 shows a flow diagram of a synchronized video and audio media file sharing among a group of users with handheld devices forming a local wireless network.

A method for an accurate synchronization between playing video signals displayed by the projector and playing the audio signals by each individual media device is described as follows. As shown in FIG. 8, the process 800 starts by establishing a local wireless network through the wireless network interfaces from each device joining the group (802). Before the projector unit is detached from the handheld unit, the clock 240 from the handheld unit 106 and the clock 242 from the projector unit 104 are calibrated in a manner that the clock time of the handheld unit is adjusted to the same time as the clock time of the projector unit. The video/audio files to be played are then copied into the auxiliary file system in the projector unit (804). After the projector unit is detached from the handheld unit (806), the auxiliary processor sends a signal to each connected device in the local wireless network (808). The receiving time of the signal by each device is recorded by a processor in each device. An acknowledgement signal is sent back to the projector unit by each media device with the recorded receiving time of the signal (810). The auxiliary processor of the projector unit calculates the recorded receiving time difference in reference to the handheld device from the control user that has been calibrated previously. The recorded time difference for each device in the network is then sent back and received by each device (812). The calibration data for each device is stored in the respective cache of the device for further usage.

The control user holding the handheld device 106 selects a metadata of a video/audio file stored in the projector unit and sends the metadata to the projector unit (814). The auxiliary processor retrieves the associated video/audio file and program the file with a starting time for playing. The projector unit broadcasts the audio portion of the file to the local network while sending the video portion of the file to the projector driver to generate the video signal suitable for driving the projector to project the visual image (816). After receiving the audio file with the attached starting time, the processor in each device recalculate starting time based on the stored clock calibration data (818). The last step of the process 800 relates to the operation of processing of video signals for the projector and of the audio signals for external speakers of the media devices in the local wireless network. Therefore, the video signals can be projected by the micro projector and the audio signals by earphones based on clock times of each device that have been calibrated accurately.

Figure 9:
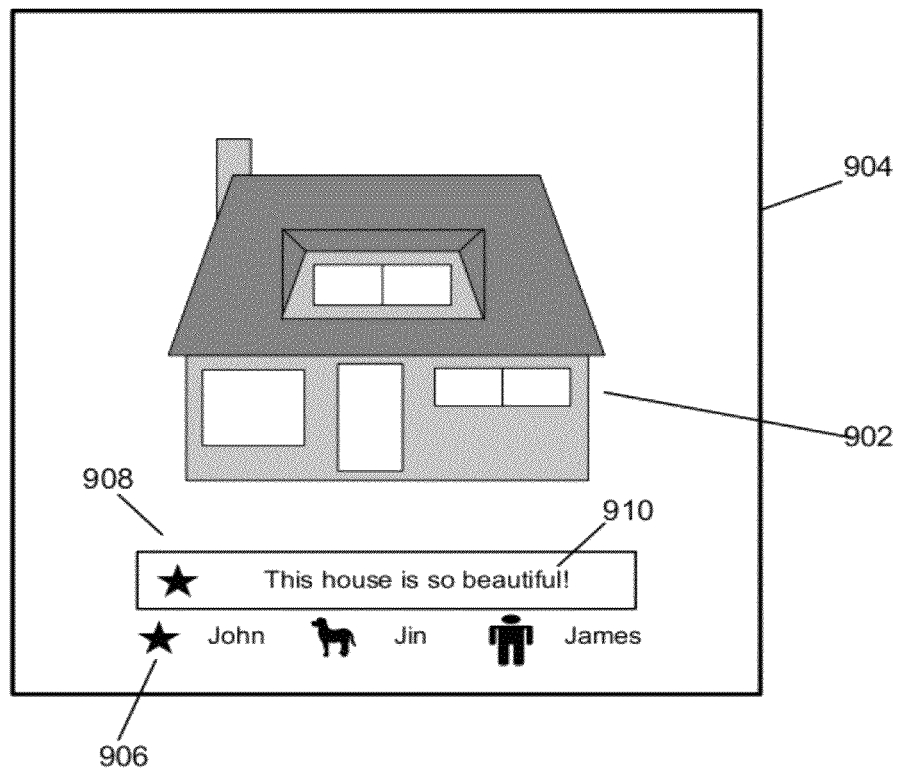
FIG. 9 shows a schematic diagram of a projected display with a user interactive window and a symbolic representation of each user in the group.

FIG. 9 shows a schematic of a projected display with a user interactive window and a symbolic representation of each user in the group. A video file 902 is displayed on a surface 904 and is viewed by all users in the group. Each user with a device connected to the local wireless network has a symbolic representation 906 on the screen. The interactive window 908 is used for users to communicate with each other by delivering comments about the media file or comments about any other matters (910) in a manner that is visible to the whole group. The users are able to enjoy the video/audio file in a synchronized manner while they can chat with each other by use of such an interactive window on the screen. The messages shown in the interactive window 908 are sent by each device through the wireless network to the projector unit. After receiving the message, the auxiliary processor controls the signal processing and sends the messages as visual signals displayed through the projector to the display surface.

One of potential issues of the system proposed in the present disclosure is that the battery power of the projector unit limits the length of the video/audio program because the lasers used in the projector unit consume significant amount of power. A novel method is disclosed to prolong the playing time of the projector by use of the power supply of other detachable projector units from other handheld devices. For such applications, each projector unit will have an open slot, which can be used to connect with another projector unit. The connection includes an IEEE 1394 compliant type connector. The two units are connected and a latch system is utilized to ease the connecting and disconnecting operations as those are obvious to the ones familiar with the art.

Figure 10:
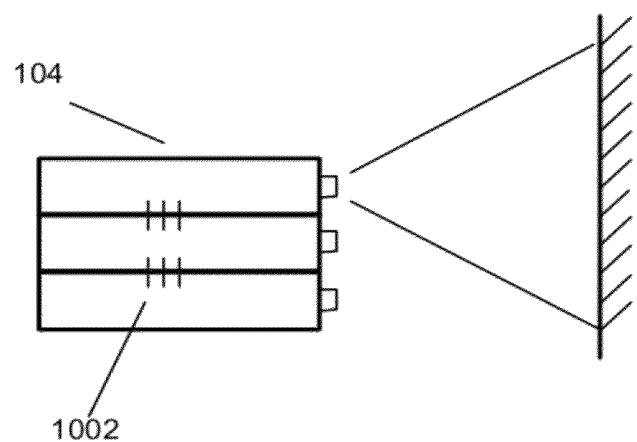
FIG. 10 shows a schematic representative of a plurality of projector units connected together to supply more power and more media files.

FIG. 10 shows a schematic representative of a plurality of projector units connected together to supply more power to the projector unit that is under the projection operation. In this embodiment, the auxiliary processor in the projector unit under operation measures the remaining power of the battery. It connects the projector unit to the battery of the adjacent projector unit when the power supply in the operating unit is running out. The power management system of the projector unit is designed in such a manner that the switching of the battery to supply other connected projector unit is allowed. The process is extendable to batteries in the other connected projector units till all the battery power in the bundled projector cluster is depleted. Furthermore, the projector unit may have a separate slot, which can be used to connect to an external power supply for providing power and charging up all batteries from the bundled projector units.

Figure 11:
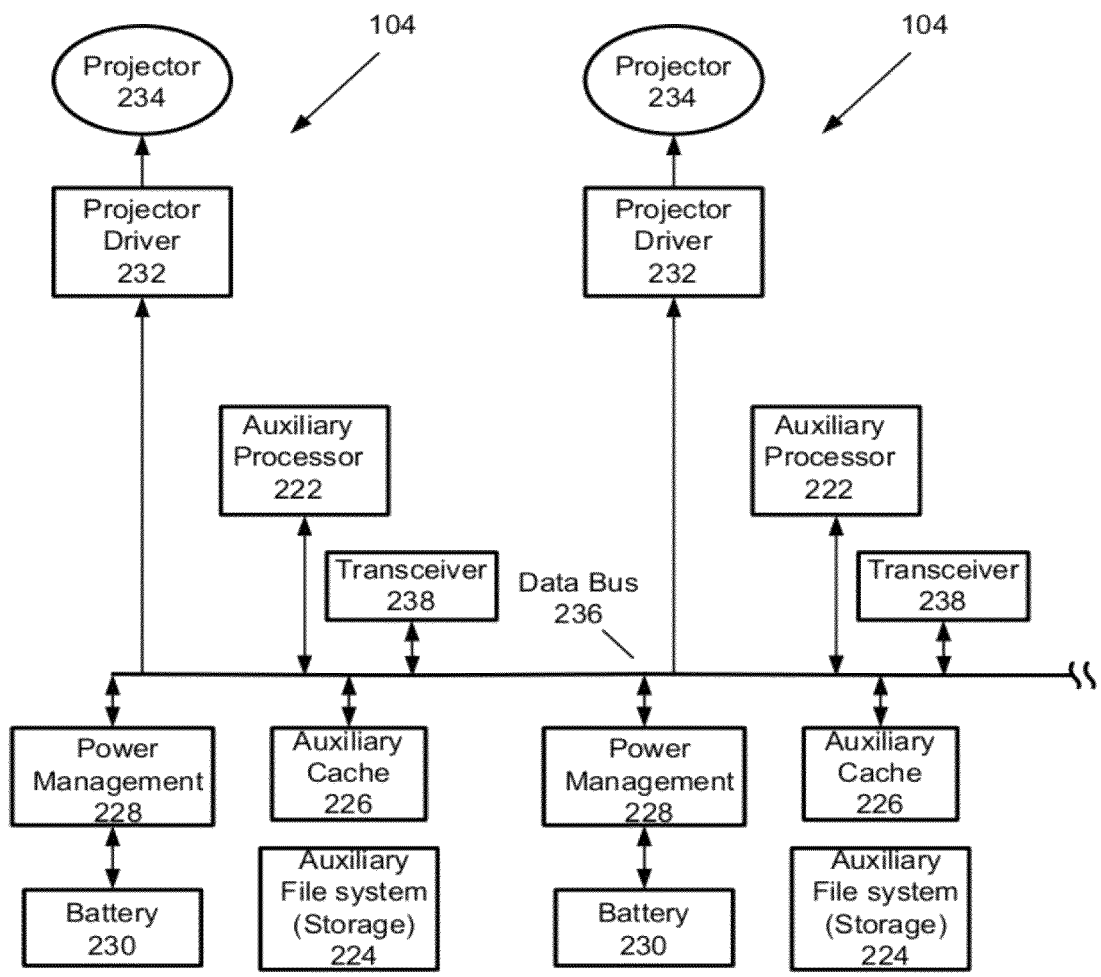
FIG. 11 shows a schematic diagram of functional blocks of an expandable projector unit with a plurality of similar projector units connected in parallel.

FIG. 11 shows a schematic of a plurality of projector units connected through connectors 1002. The auxiliary processor of the projector under projection operation controls the bundled projector units. The media files stored in auxiliary file system of other connected projector unit are assessable to the auxiliary processor 222, which is able to broadcast the metadata of these media files through the local wireless network. After the receiving the metadata of the media files by the handheld unit, the control user decides if some of the media files in the other projector units are used for sharing by the group.

While the invention has been disclosed with respect to a limited number of embodiments, numerous modifications and variations will be appreciated by those skilled in the art. Additionally, although the invention has been described particularly with respect to media player, the inventive concepts can be easily expanded to a mobile communication device or an integrated mobile media and communication device. Furthermore, although the video/audio signal is selected as an illustration to explain the present invention, it should be understood that the inventive concepts disclosed herein are also generally applicable to other type of media files such as movies, TV programs, e-book and any other media for entertainment, education and any other application. It is intended that all such variations and modifications fall within the scope of the following claims:

The invention claimed is:

1. A wireless network for delivering a media asset including a video file and an audio file to a plurality of users, the network comprising:
    a. a plurality of media and communication devices, wherein each of said devices is carried by a user and one of said device is a controlling device;
    b. a projector unit for delivering a video file through a micro projector;
    c. a wireless network for connecting said devices and said projector unit, wherein said projector unit is connectable to at least the controlling device through a wired connector and media assets can be transferred from said controlling device to said projector unit through said wired connector; wherein said controlling device and said projector unit are in single piece after said device and said projector unit are connected;
    wherein said audio file can be transmitted from said controlling device or said projector unit to said devices through said wireless network; and
    wherein said controlling device can be used as a remote control device for controlling operations of delivering the video file through said projector unit and delivering said audio files through said devices connected to the wireless network.

2. The network as recited in claim 1, wherein said network further comprising a means of delivering said video file and delivering said audio file in all connected devices in a synchronized manner.

3. The network as recited in claim 1, wherein a data file including metadata of transferred media assets is established by a processor of said controlling device and is stored in a file storage system or a cache of said controlling device, wherein said data file may be transmitted to the devices connected to the wireless network.

4. The network as recited in claim 1, wherein metadata of at least a portion of said transferred assets may be displayed through a user interface of said controlling device for the controlling user to select, wherein selected metadata may be transmitted to said projector unit to initiate an operation of retrieving and delivering said video file.

5. The network as recited in claim 1, wherein said each of media and communication devices further comprising:
    a. a processor pertaining to control operation of the device;
    b. a file storage system for storing data files;
    c. a communication interface for networking; and
    d. a battery for supply power for the operation of the device.

6. The network as recited in claim 1, wherein said projector unit further comprising:
    a. a processor pertaining to control operation of said unit;
    b. a file storage system for storing data files;
    c. a communication interface for networking; and
    d. a battery for supply power for the operation of the unit, wherein said processor, said file storage system and said battery may be used as additional resources for the controlling device when said unit and said controlling device are connected through the wired connector.

7. The network as recited in claim 1, wherein said wireless network conforms to one or a combination of following standards:
    a. Wi-Fi;
    b. Bluetooth; and
    c. ZigBee.

* * * * *